United States Patent
Menosky et al.

(10) Patent No.: US 6,893,350 B2
(45) Date of Patent: May 17, 2005

(54) UNIVERSAL JOINT WITH TORSIONALLY-COMPLIANT SPIDER ASSEMBLY

(75) Inventors: Marc. M. Menosky, Burt, MI (US); Salvatore N. Grupido, Rochester, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/434,434

(22) Filed: May 8, 2003

(65) Prior Publication Data

US 2004/0224778 A1 Nov. 11, 2004

(51) Int. Cl.⁷ ............................................. F16D 3/40
(52) U.S. Cl. ................................. 464/87; 464/136
(58) Field of Search ........................... 464/87, 92, 112, 464/136

(56) References Cited

U.S. PATENT DOCUMENTS

| | | | |
|---|---|---|---|
| 1,942,746 A | * | 1/1934 | Degener ................ 464/136 X |
| 2,024,777 A | * | 12/1935 | Neumann ............... 464/136 X |
| 2,453,012 A | * | 11/1948 | Hickman ..................... 464/87 |
| 2,773,336 A | | 12/1956 | Slaght |
| 2,844,949 A | * | 7/1958 | Stillwagon, Jr. ............ 464/136 |
| 3,200,615 A | | 8/1965 | Stokely |
| 3,212,290 A | * | 10/1965 | Walden .................. 464/112 X |
| 3,296,827 A | * | 1/1967 | Landon, Jr. et al. .......... 464/92 |
| 3,342,041 A | * | 9/1967 | Nebiker, Jr. ................. 464/87 |
| 3,377,820 A | | 4/1968 | Smith |
| 3,479,840 A | | 11/1969 | Meyers |
| 3,595,586 A | | 7/1971 | Anderson |
| 3,618,339 A | * | 11/1971 | Chisholm ................. 464/87 X |
| 3,658,395 A | | 4/1972 | Hallerback |
| 3,788,100 A | | 1/1974 | Pitner |
| 3,858,413 A | | 1/1975 | Nemtsov et al. |
| 3,906,746 A | | 9/1975 | Haines |
| 4,021,085 A | | 5/1977 | Willyard |
| 4,154,490 A | | 5/1979 | Kohler et al. |
| 4,312,547 A | | 1/1982 | Negele et al. |
| 4,366,966 A | | 1/1983 | Ratsko et al. |
| 4,371,358 A | | 2/1983 | Laue |
| 4,419,086 A | | 12/1983 | Condon |
| 4,440,401 A | | 4/1984 | Olschewski et al. |
| 4,492,129 A | * | 1/1985 | Hasegawa |
| 4,512,672 A | | 4/1985 | Olschewski et al. |
| 4,515,574 A | | 5/1985 | Mazziotti |
| 4,530,675 A | | 7/1985 | Mazziotti |
| 4,576,382 A | | 3/1986 | Scharting et al. |
| 4,592,556 A | | 6/1986 | Nieman et al. |
| 4,611,932 A | | 9/1986 | Olschewski et al. |
| 4,645,474 A | | 2/1987 | Olschewski et al. |
| 4,669,737 A | | 6/1987 | Diffenderfer |
| 4,810,233 A | | 3/1989 | Crane, Jr. et al. |
| 4,834,691 A | | 5/1989 | Schultze et al. |
| 4,861,315 A | | 8/1989 | Mazziotti |
| 4,874,349 A | | 10/1989 | Gall |
| 5,026,324 A | | 6/1991 | Schurger et al. |
| 5,342,240 A | | 8/1994 | Mazziotti |
| 5,407,387 A | | 4/1995 | Mazziotti et al. |
| 5,454,759 A | | 10/1995 | Kretschmer et al. |
| 5,551,919 A | * | 9/1996 | Cherpician .................. 464/92 |
| 5,591,085 A | | 1/1997 | Stall et al. |
| 5,597,356 A | | 1/1997 | Rieder |

(Continued)

FOREIGN PATENT DOCUMENTS

| | | | | |
|---|---|---|---|---|
| FR | 1333940 | * | 6/1963 | ................ 464/87 |
| GB | 944695 | * | 12/1963 | ................ 464/87 |

Primary Examiner—Greg Binda
(74) Attorney, Agent, or Firm—Harness, Dickey & Pierce P.L.C.

(57) ABSTRACT

A torsionally-compliant universal joint includes a cruciform having trunnion posts partially encapsulated within a body. The body is formed from an elastomeric material. A bearing cup assembly is rotatably coupled to one of the trunnion posts. The bearing cup assembly is coupled to a yoke.

13 Claims, 4 Drawing Sheets

U.S. PATENT DOCUMENTS

| | | |
|---|---|---|
| 5,613,691 A | 3/1997 | Komai et al. |
| 5,626,520 A | 5/1997 | Mazziotti |
| 5,716,277 A | 2/1998 | Reynolds |
| 5,725,431 A | 3/1998 | Myers et al. |
| 5,769,723 A | 6/1998 | Faulbecker et al. |
| 5,813,916 A | 9/1998 | Lentini et al. |
| 5,865,678 A | 2/1999 | Koedam et al. |
| 6,059,663 A | 5/2000 | Jones et al. |
| 6,077,166 A | 6/2000 | Reynolds |
| 6,129,634 A | 10/2000 | Nieman |
| 6,162,126 A | 12/2000 | Barrett et al. |
| 6,183,369 B1 | 2/2001 | Faulbecker et al. |
| 6,189,413 B1 | 2/2001 | Morse et al. |
| 6,264,566 B1 | 7/2001 | Nieman et al. |
| 6,280,335 B1 | 8/2001 | Wehner et al. |
| 6,315,296 B1 | 11/2001 | Oldenburg |
| 6,336,868 B1 | 1/2002 | Kurecka et al. |
| 6,357,757 B1 | 3/2002 | Hibbler et al. |
| 6,406,187 B1 | 6/2002 | Lentini et al. |
| 6,406,373 B1 | 6/2002 | Gibson |
| 6,464,228 B1 | 10/2002 | Oldenburg |

\* cited by examiner

UNIVERSAL JOINT WITH TORSIONALLY-COMPLIANT SPIDER ASSEMBLY

BACKGROUND OF THE INVENTION

The present invention generally relates to a universal joint for use in a driveline of a motor vehicle. More specifically, the present invention pertains to a universal joint including a torsionally-compliant spider assembly.

Motor vehicle power transmission systems often include an engine, a transmission and a vehicle driveline to provide motive force to a driven wheel or wheels. The driveline typically includes at least a pair of rotary shafts interconnected to one another for transferring drive torque to the driven wheels of the vehicle. Based on the physical characteristics of the many interrelated components, undesirable feedback is sometimes transmitted to the occupants of the vehicle in the form of noise, vibration and harshness (NVH).

Most of the components previously described are constructed from steel or another structurally robust metal. The use of these rigid, substantially non-compliant components within the vehicle driveline has been known to transmit the undesirable NVH characteristics throughout the vehicle.

Universal joints are used in the motor vehicle driveline for interconnecting pairs of rotary shafts and permitting changes in angularity therebetween. Many conventional universal joints include a pair of bifurcated yokes which are secured to the rotary shafts. The bifurcated yokes are interconnected by a spider, also known as a cruciform, for rotation about independent axes. The cruciform is typically constructed from steel and includes four orthogonal trunnions with each opposing pair of axially aligned trunnions mounted in a pair of aligned bores formed in the bifurcated yokes. Typically, a metal bearing cup is secured in each bore and a bearing assembly is retained in the bearing cup such that each yoke is supported for pivotal movement relative to one of the pairs of trunnions. Based on the materials and geometrical configuration described, existing universal joints are substantially rigid and torsionally non-compliant.

SUMMARY OF THE INVENTION

Accordingly, it is an object of the present invention to provide a universal joint with a torsionally compliant spider assembly which may provide vibration-damping properties. The universal joint of the present invention includes a cruciform having a body constructed from an elastomer having a predefined material durometer. The elastomeric body isolates certain frequency ranges and functions to reduce the transmission of undesirable NVH characteristics. The durometer of the elastomer may be easily varied to specifically isolate certain frequency ranges thereby allowing a designer to tailor a universal joint to a specific vehicle.

Furthermore, the geometry of the body may be modified to further target certain frequency ranges. Four trunnion posts are partially encapsulated within the elastomeric body to provide bearing surfaces on which the bearing cup assemblies are mounted.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figure 1:
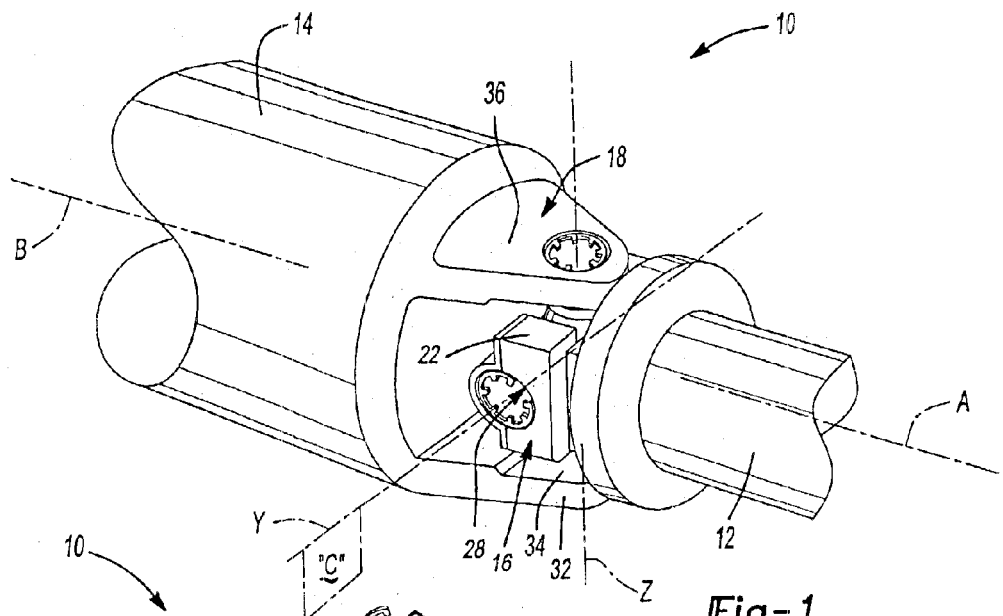
FIG. 1 is a perspective view of a universal joint according to the principals of the present invention.
Figure 2:
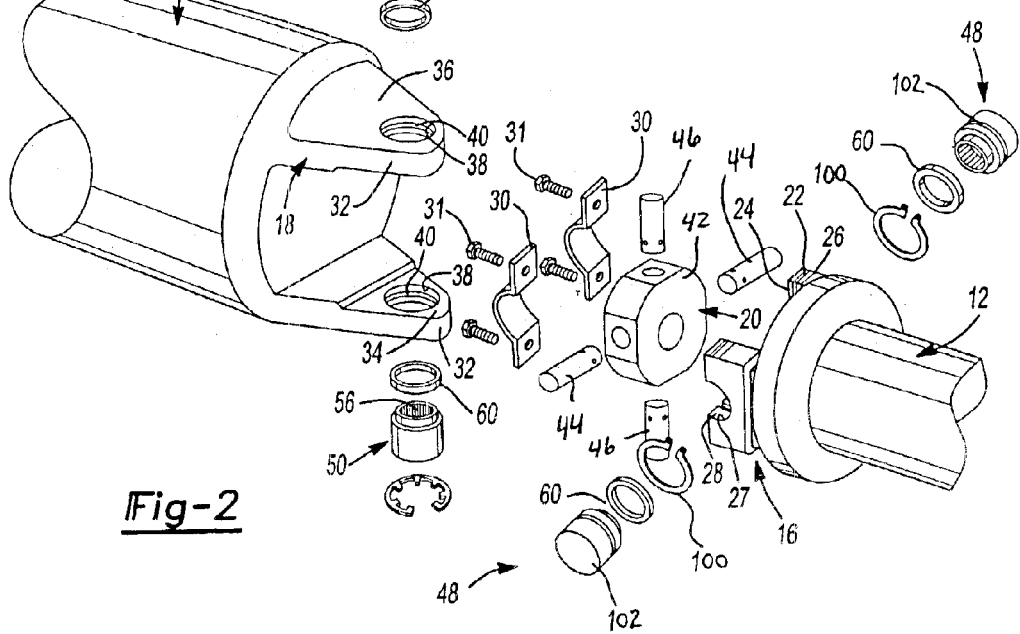
FIG. 2 is an exploded perspective view of the universal joint shown in FIG. 1.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally-spaced legs 22 which are preferably symmetrical with respect to the rotary axis of first shaft 12, as denoted by construction line "A". Legs 22 include an inboard surface 24 and an outboard surface 26 with a journal 27 extending therebetween. Apertures 28 are formed by coupling a pair of end caps 30 to legs 22 via fasteners 31. End caps 30 cooperate with journals 27 to complete apertures 28. Apertures 28 are aligned on a first trunnion axis, as denoted by construction line "Y", which passes through and is orthogonal with respect to rotary axis "A" of first shaft 12.

Second yoke 18 is bifurcated and includes a pair of laterally-spaced legs 32 which are preferably symmetrical with respect to the rotary axis of second shaft 14, as denoted by construction line "B". Legs 32 include an inboard surface 34 and an outboard surface 36 with an aperture 38 extending therebetween. Apertures 38 are aligned on a second trunnion axis, as denoted by construction line "Z", which passes through and is orthogonal with respect to rotary axis "B" of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring groove 40 may be formed by machining, casting or by similar technique.

Figure 3:
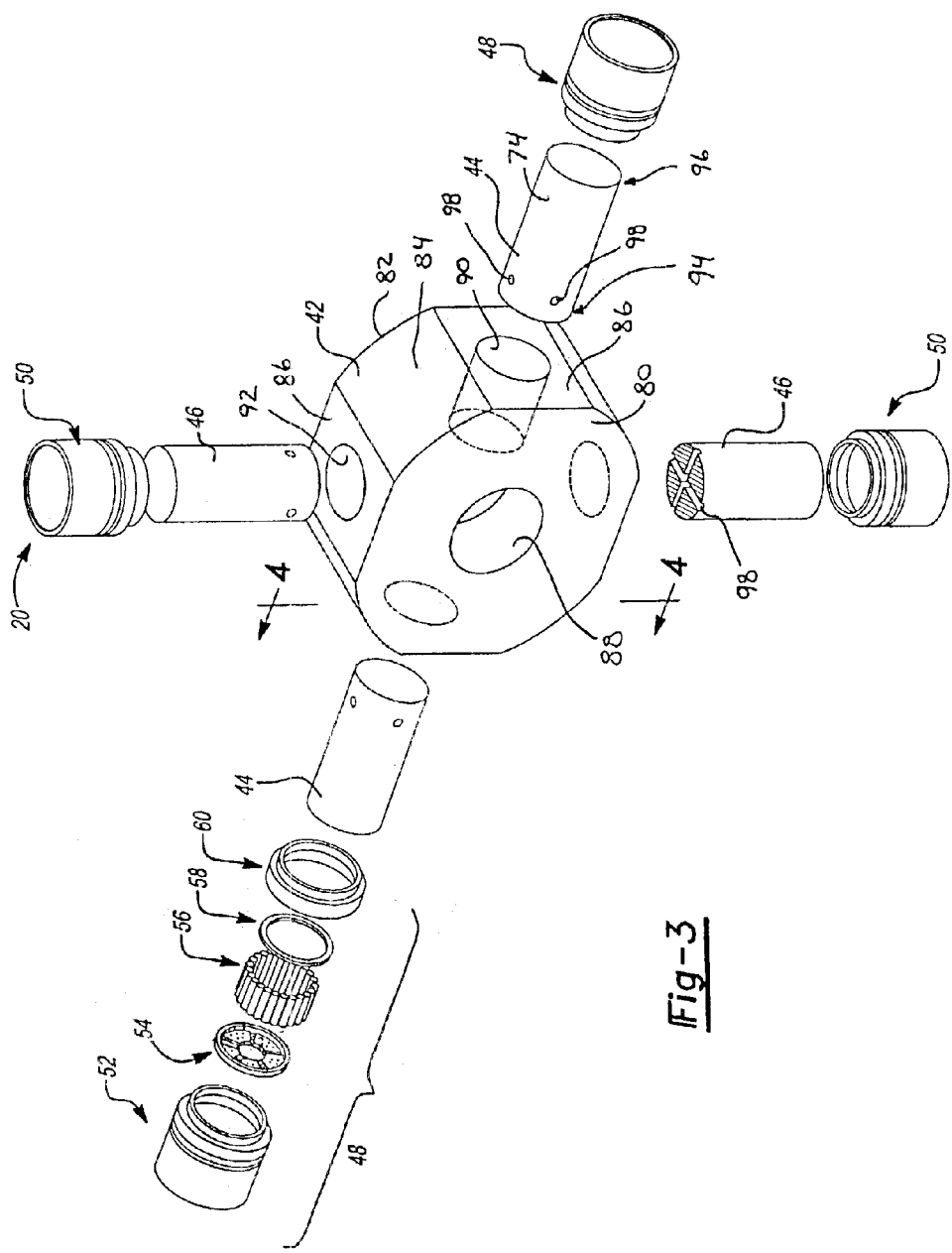
FIG. 3 is a partial exploded perspective view of a cruciform and bearing cup assembly of the present invention.

As best seen in FIGS. 2 and 3, cruciform 20 includes a body 42 from which a pair of first trunnion posts 44 and a pair of second trunnion posts 46 extend as will be described in greater detail hereinafter. First trunnion posts 44 are orthogonal with respect to second trunnions 46. First trunnion posts 44 are adapted for insertion into apertures 28 in legs 22 of first yoke 16 so as to be axially aligned on first trunnion axis "Y". Similarly, second trunnion posts 46 are adapted to be inserted into apertures 38 in legs 32 of second yoke 18 so as to be axially aligned on second trunnion axis "Z". With first trunnion posts 44 and second trunnion posts 46 installed in first and second yokes 16 and 18, respectfully, trunnion axes "Y" and "Z" pass through a common plane "C" which orthogonally intersects the rotary axis of cruciform 20, as shown in FIG. 1.

Universal joint 10 also includes a first pair of bearing cup assemblies 48 adapted to be mounted in apertures 28 and a second pair of bearing cup assemblies 50 adapted to be mounted in apertures 38. First bearing cup assemblies 48 are provided for receiving and rotatably supporting first trunnion posts 44 in apertures 28. Similarly, second bearing cup assemblies 50 are provided for receiving and rotatably supporting second trunnion posts 46 in apertures 38. For purposes of brevity, the following description will be limited to the components of first bearing cup assemblies 48 with the understanding that the corresponding components of second bearing cup assemblies 50 are substantially identical.

Figure 4:
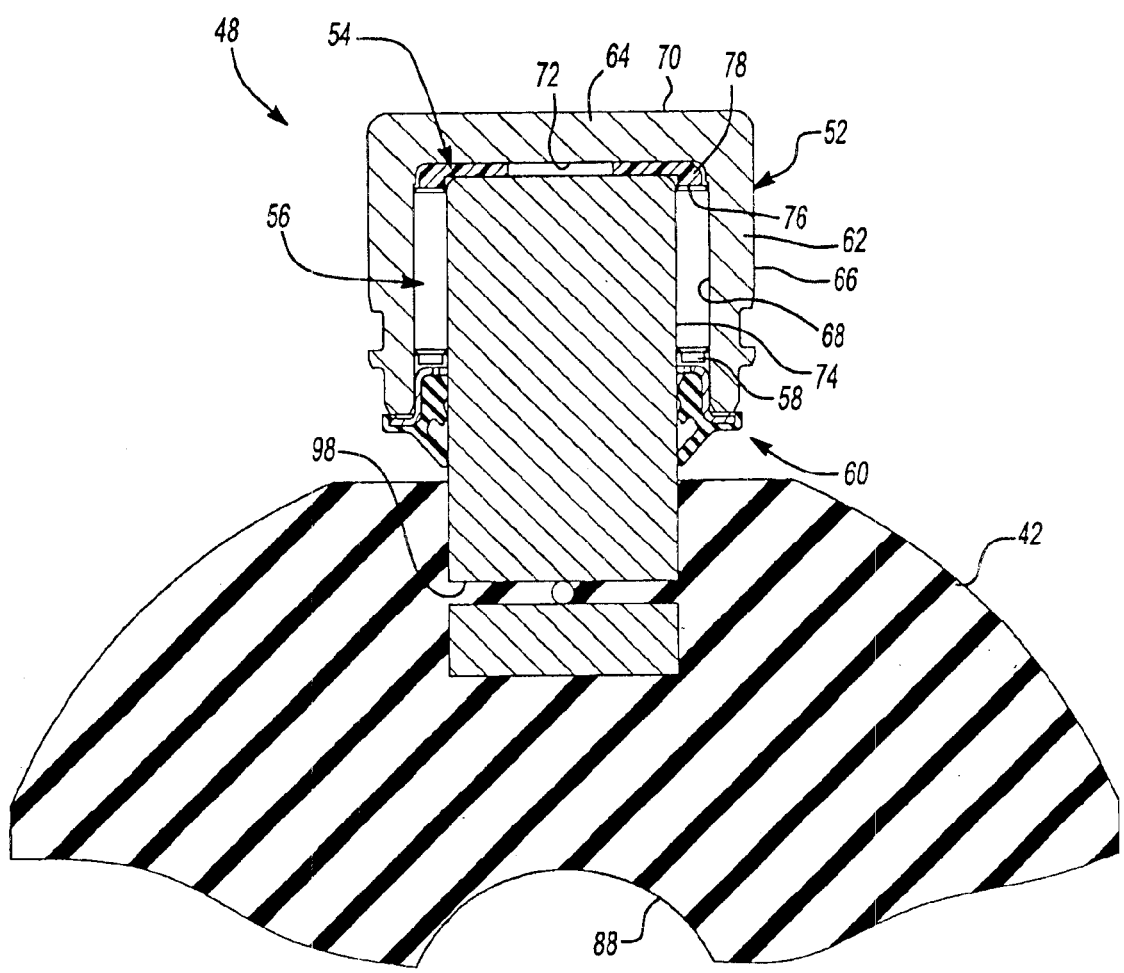
FIG. 4 is a partial cross-sectional side view of a universal joint including a cruciform having an elastomeric body constructed in accordance with the teachings of the present invention.

FIGS. 3 and 4 depict each bearing cup assembly 48 as including a bearing cup 52, a thrust washer 54, roller bearings 56, a seal washer 58 and a seal 60. Bearing cup 52 is substantially hollow and cylindrical in shape. Bearing cup 52 includes a substantially cylindrical tubular segment 62 closed at one end by an end segment 64. Tubular segment 62 includes an outer wall surface 66 and an inner wall surface 68. End segment 64 includes an outer surface 70 and an inner surface 72. Roller bearings 56 are positioned between inner wall surface 68 and an outer cylindrical surface 74 of first trunnion post 44 to allow relative rotary movement between bearing cup 52 and first trunnion posts 44. Roller bearings 56 are oriented to rotate on an axis parallel to axis "Y" of first trunnion posts 44 and are arranged in a circumferential array about this axis. One end of each roller bearing 56 is supported to roll against a bearing surface 76 formed on a circumferential flange segment 78 of thrust washer 54. The opposite ends of roller bearings 56 are captured by seal washer 58 and seal 60. Seal 60 extends between inner wall surface 68 of bearing cup 52 and first trunnion post 44 to protect roller bearings 56 from contamination and to retain lubricant within bearing cup assembly 48.

Torsional compliance is introduced within universal joint assembly 10 via body 42 of cruciform 20. Body 42 is a substantially disk-shaped member having a first substantially planar surface 80, a second substantially planar surface 82 and an outer surface 84 extending between first planar surface 80 and second planar surface 82. First planar surface 80 and second planar surface 82 are positioned substantially parallel to one another such that body 42 defines a substantially constant thickness. Four substantially planar bosses 86 are equally spaced about outer surface 84 and extend from first planar surface 80 to second planar surface 82. Outer surface 84 is depicted in FIG. 3 as a substantially cylindrical surface. A central aperture 88 extends through body 42 from first planar surface 80 to second planar surface 82. Two co-axial blind bores 90 enter body 42 from two opposing bosses 88. Two additional co-axial blind bores 92 enter body 42. Blind bores 92 are orthogonally positioned relative to blind bores 90. Central aperture 88 extends along an axis orthogonally positioned relative to the axis containing blind bores 92 and the axis containing blind bores 90.

First trunnion posts 44 are positioned within first pair of co-axial blind bores 90. Second trunnion posts 46 are positioned within second pair of co-axial blind bores 92. Preferably, each of the trunnion posts 44 and 46 are partially encapsulated during a molding process where a molten elastomer is injected into a mold containing first trunnion posts 44 and second trunnion posts 46.

Each of trunnion posts 44 and 46 are substantially similar to one another. As such, only one trunnion post 44 will be described in detail. Trunnion post 44 is a substantially cylindrical member having a first end 94, a second end 96 and outer cylindrical surface 74. A pair of transversely extending, orthogonally oriented passageways 98 extends through trunnion post 44 at first end 94. Passageways 98 are filled with molten elastomer during the injection molding process. The solidification of elastomer within passageways 98 mechanically locks trunnion post 44 within body 42.

Once bearing cup assemblies 48 and 50 are installed on first trunnion posts 44 and second trunnion posts 46, the bearing cup assemblies are inserted into leg apertures 28 and 38. Thereafter, cruciform 20 is centered, dynamically balanced and coupled to legs 22 and 32. A variety of methods for securing yokes 16 and 18 to cruciform 20 are available. One method includes mounting a snap ring 100 within a circumferential groove 102 formed on outer wall surface 66 of bearing cup 52. Snap ring 100 engages inboard surface 24 to retain the bearing assembly. Alternatively, portions of outboard surface 26 surrounding apertures 28 may be deformed using processes such as staking or peening to create local areas which engage outer surface 70 of bearing cup 52. Another method involves injecting molten resin within a passageway extending between the leg and the bearing cup. The molten resin solidifies to retain the bearing cup within the aperture of the leg. Yet another retention method incorporates the use of projections (not shown) extending from legs 22 which may be deformed to engage a snap ring against outer surface 70 of bearing cup 52. One or more of these methods is disclosed in commonly-owned U.S. Pat. Nos. 6,280,335, 6,162,126 and 6,336,868, the entire disclosure of each being hereby incorporated by reference.

During operation of assembled universal joint 10, a driving shaft such as shaft 12 imparts a torque to first yoke 16. Load is transferred from first yoke 16 to first pair of trunnion posts 44. Shaft 14 receives drive torque by load passing through elastomeric body 42 prior to entering second pair of trunnion posts 46. Because body 42 is constructed from an elastomer such as rubber, some energy is absorbed and converted into heat. Based on the geometrical configuration of body 42 and the durometer of the elastomer, certain frequencies may be isolated and effectively eliminated from transfer during the power transmission process. Accordingly. It should be appreciated that body 42 may be configured in any number of shapes without departing from the scope of the present invention. Also it should be appreciated that the use of the word "durometer" is short hand for durometer hardness or hardness. Furthermore, body 42 may include apertures in addition to central aperture 88 to achieve the, desired frequency isolation characteristic desired. Conversely, central aperture 88 may be eliminated in its entirety in order to eliminate certain NVH characteristics.

Figure 5:
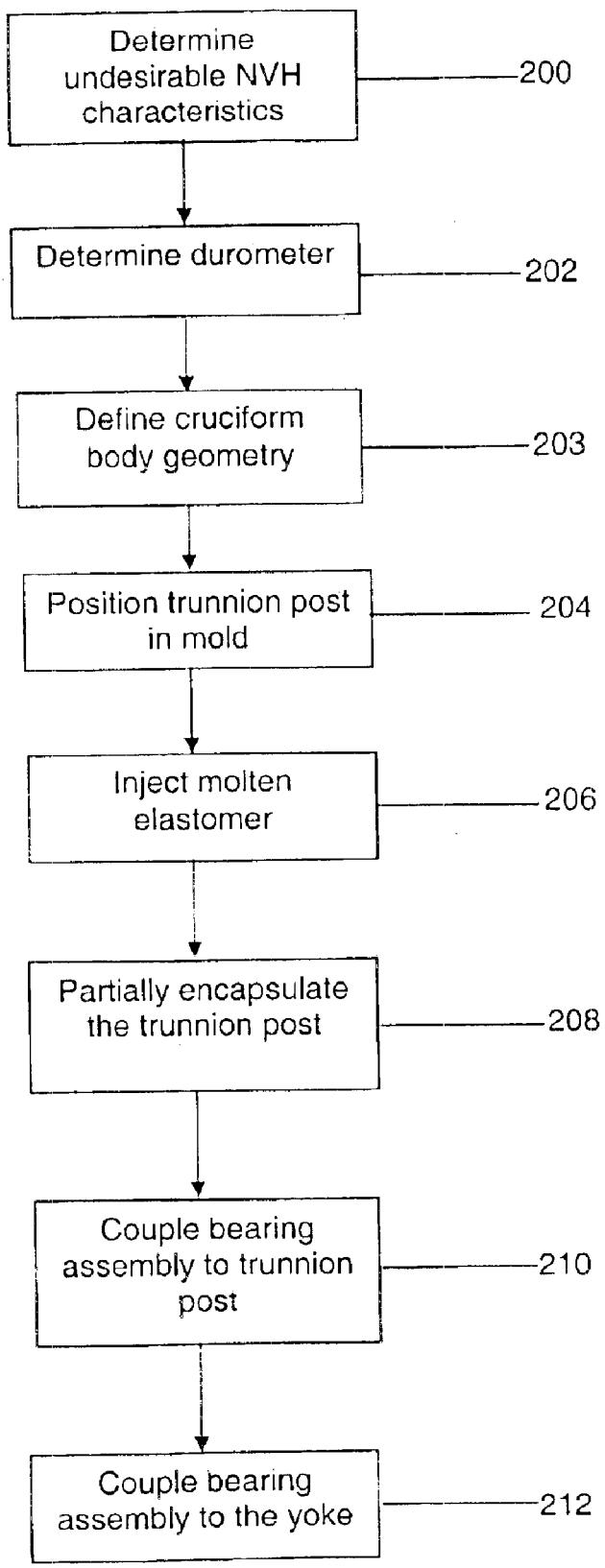
FIG. 5 is a chart depicting a method of making a universal joint according to the teachings of the present invention.

The method of making a cruciform according to the teachings of the present invention is provided at FIG. 5. Step 200 describes determining a range of frequencies to be isolated. In this step, certain NVH characteristics are identified and targeted to be eliminated or dampened. In step 202, the durometer of the elastomeric material is determined. In the process of selecting the durometer of material, the material itself is selected. Accordingly, the step of selecting the durometer of material may include defining other physical properties of the elastomer such as chemical composition and physical properties. At step 203, the geometry of body 42 is defined. Certain geometrical shapes may enhance the ability of cruciform 20 to isolate undesirable NVH characteristics. Aperture 88 is an example of such a geometrical modification. Step 204 includes positioning a trunnion post within a mold. In the embodiment shown, first end 94 of trunnion post 44 is positioned within a cavity (not shown) of the mold. Second end 96 of trunnion post 44 is not in communication with the cavity. Molten elastomeric material is injected within the cavity mold at step 206. Upon solidification of the molten elastomer, trunnion post 44 is partially encapsulated by solidified elastomer at step 208.

Bearing cup assembly is rotatably coupled to each trunnion post at step 210. The method of making the universal joint is completed at step 212 by coupling the bearing assembly to the yoke.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A torsionally-compliant universal joint assembly comprising:
    a yoke;
    a bearing assembly; and
    a cruciform having a compliant body and a trunnion post coupled to said body, said bearing assembly rotatably interconnecting said trunnion post and said yoke, wherein said trunnion post is partially encapsulated within said body and fixed thereto.

2. The universal joint of claim 1 wherein said trunnion post includes an aperture at least partially filled with an elastomeric material used to form said compliant body.

3. A torsionally-compliant universal joint comprising:
    a yoke;
    a cruciform;
    a bearing rotatably interconnecting said cruciform and said yoke, wherein said cruciform includes:
    a body molded from an elastomeric material;
    a first pair of coaxially aligned trunnion posts partially encapsulated by said body; and
    a second pair of coaxially aligned trunnion posts partially encapsulated by said body, said second pair of trunnion posts being orthogonally oriented relative to said first pair of trunnion posts, each of said trunnion posts including an aperture in receipt of a portion of said elastomeric material to retain said trunnion posts within said body.

4. The torsionally-compliant universal joint of claim 3 wherein said body includes a substantially cylindrically shaped outer surface having a plurality of substantially planar surfaces interrupting said cylindrical surface.

5. The torsionally-compliant universal joint of claim 4 wherein a portion of each of said trunnion posts extends outwardly from said body at one of said substantially planar surfaces.

6. The torsionally-compliant universal joint of claim 5 wherein said body includes an aperture extending therethrough, said body aperture extending along an axis orthogonally positioned relative to each of said first and second pair of coaxially aligned trunnion posts.

7. The torsionally-compliant universal joint of claim 6 wherein said apertures of said trunnion posts transversely extend through said trunnion posts.

8. The torsionally-compliant universal joint of claim 3 wherein said elastomeric material is rubber.

9. The torsionally-compliant universal joint of claim 3 wherein said elastomeric material exhibits a predetermined hardness to vibrationally dampen a desired frequency range.

10. A torsionally-compliant universal joint comprising:
    a yoke having a bore;
    a bearing cup mounted within said bore;
    a bearing positioned within said bearing cup to rotatably couple said yoke to a cruciform, said cruciform including an elastomeric body and four trunnion posts coupled to said elastomeric body, each of said trunnion posts having a longitudinal axis substantially extending within a single plane, each of said longitudinal axes being positioned substantially perpendicular to an adjacent trunnion post axis, a first portion of each of said trunnions being encapsulated by said elastomeric body and a second portion of one of said trunnions being positioned within said bearing cup, wherein said body is formed from a material operable to isolate predetermined frequencies and reduce the transmission of vibration.

11. The torsionally-compliant universal joint of claim 10 wherein at least one of said trunnion posts includes an aperture in receipt of molten injection moldable elastomeric material.

12. The torsionally-compliant universal joint of claim 11 wherein said aperture includes a bore extending through said first portion of said trunnion post.

13. The torsionally-compliant universal joint of claim 12 wherein said elastomeric material is selected from a group of materials having different hardness, said materials of different hardness being operable to isolate different ranges of frequencies.

* * * * *